Nov. 17, 1964   G. B. FETROW ETAL   3,157,135
PIZZA ROLLER DEVICE
Filed June 29, 1962
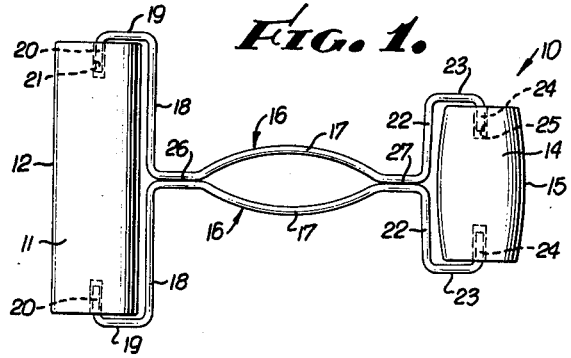
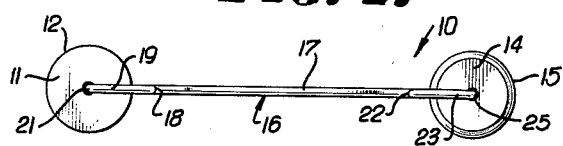
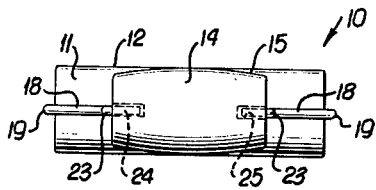
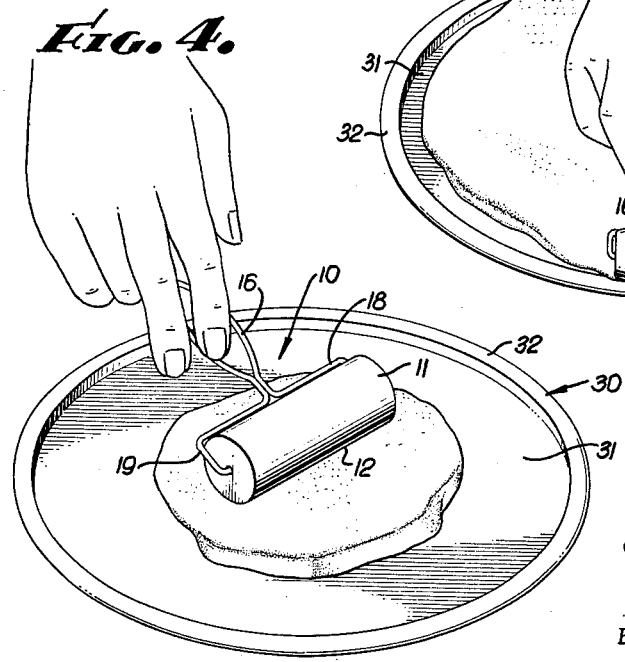
GENE B. FETROW
GLORIA S. FETROW
INVENTORS.
BY *Miketta and Glenny*
ATTORNEYS.

United States Patent Office 3,157,135
Patented Nov. 17, 1964

3,157,135
PIZZA ROLLER DEVICE
Gene B. Fetrow and Gloria S. Fetrow, both of 764 W. Rosewood Court, Ontario, Calif.
Filed June 29, 1962, Ser. No. 206,399
1 Claim. (Cl. 107—50)

This invention relates to a novel pizza roller device particularly useful in rapidly preparing pizza dough of selected thickness and circular form in a pizza pan.

This application is a continuation-in-part of application Serial No. 70,019, filed November 17, 1960, on a pizza pie roller, said application Serial No. 70,019 being abandoned in favor of the present continuation-in-part application.

Pizza dough is unlike usual bakery dough. Pizza dough is made of ingredients which render the dough quite tough, elastic, and sticky. The dough is so elastic that, traditionally, a pizza maker would be able to twirl the dough on his hands in order to develop an enlarged, circular pizza dough form of selected size. Those who are not expert in twirling pizza dough have attempted to use pizza dough in a pizza pan which is normally flat with a slightly upturned, inclined edge. Even small rolling pins are awkward to handle in spreading the dough in a pizza pan. Such rollers will not provide complete spreading of the pizza dough in a pizza pan because of interference with the upturned, inclined edge of the pan. As a result, most makers of pizza dough in the home do not roll the dough but instead first center the ball of pizza dough and then push and spread the dough with their fingers and palm of the hand. Because the dough is tough and elastic and tends to return to its original form, a considerable amount of time and effort is employed in spreading the dough by hand in a pizza pan.

The present invention relates to a novel pizza roller device which provides a quick, rapid spreading of the pizza dough in a pizza pan and finishing of the dough at the circular edge margins thereof so that it properly fits the pizza pan and is of selected uniform thickness over the pizza pan. The pizza roller device of the present invention is so constructed that pressure may be readily applied to a ball of pizza dough centered in a pizza pan to rapidly accomplish major spreading of the dough and also includes means for rapidly finishing the circular edge margins of the pizza dough at the inclined edge of the pizza pan.

The primary object of the present invention therefore is to disclose and provide a novel pizza roller device.

An object of the invention is to disclose and provide a pizza roller device which will facilitate the rapid uniform spreading of pizza dough in a pizza pan.

Another object of the invention is to disclose and provide a roller device including a long roller, a short roller, and an interconnecting means for the rollers permitting free rotating movement of the rollers on their axes, the interconnecting means serving as a grasping means for a hand and the surface of one of the rollers serving as a pressure surface for contact by a palm portion of the hand so that hand pressure is transmitted along the connecting means to the other roller for pressure spreading of pizza dough.

A still further object of the invention is to disclose a roller device provided with rollers of different surface characteristics so as to permit pressure spreading of material wherein the pressure applied to the surface of the material may be varied.

Other objects and advantages of the present invention will be readily apparent from the following description of the drawings in which an exemplary embodiment of the present invention is shown.

In the drawings:
FIG. 1 is a top plan view of a pizza roller device embodying this invention.
FIG. 2 is a side view of FIG. 1.
FIG. 3 is an end view of FIG. 1.
FIG. 4 is a perspective view showing initial spreading of pizza dough in a pizza pan by the device shown in FIG. 1.
FIG. 5 is a perspective view showing final spreading of pizza dough in a pizza pan by the device shown in FIG. 1.

In FIG. 1 a pizza roller device generally indicated at 10 includes a long, cylindrical roller 11 having a length substantially less than the diameter of the smallest pizza pan to be used. Pizza pans may have diameters of from about 10 or 12 inches up to and including 24 inches. In this example, the length of the cylindrical roller 11 may be about 4 inches. Cylindrical roller 11 is of uniform diameter throughout its length and may be made from a suitable hard wood having a smooth finished surface 12.

At the other end of device 10 is provided a short roller 14 made of wood provided with a convexly curved surface 15. The curved surface 15 may be generated by an arc having a 6 inch radius, the chord of such arc lying parallel to the axis of roller 14 and being moved in a circular path about the said axis of roller 14. The maximum diameter of roller 14 may be the same as the diameter of cylindrical roller 11. In this example, the short roller 14 may have a length of about 2 inches.

Means interconnecting the long and short rollers 11 and 14 may comprise a pair of similarly formed wire members 16 arranged in the same plane and oppositely disposed. Each wire member 16 may comprise a central portion 17 convexly curved to provide a selected width to the interconnecting means between rollers 11 and 14. The wire members 16 are each provided with outwardly directed bail portions 18 which extend parallel to the axis of cylindrical roller 11, said bail portions having end portions 19 provided with inturned axle portions 20 which are received within axial bores 21 provided in the ends of roller 11.

The opposite ends of the wire members 16 are similarly constructed with shorter bail portions 22 terminating in end portions 23 provided with inturned axle portions 24 received within axial bores 25 provided in the short roller 14. The wire members 16 may be secured together at adjacent inner ends of bail portions 18 and 22 as by spot welding at 26 and 27. It will thus be apparent that the axle portions 20 and 24 provide free rotation of the rollers 11 and 14 and the central convexly curved wire portions 17 lie in the plane of the axes of the rollers and provide a convenient means for grasping the roller device. The rollers 11 and 14 are spaced sufficiently far apart by the interconnecting means so that one roller may be used to roll pizza dough independently of the other and the roller not rolling pizza dough can be conveniently used in connection with the interconnecting means to serve as a handle or pressure applying means for operating the other pizza roller.

FIGS. 4 and 5 disclose how the pizza device 10 is actually employed. A selected amount of pizza dough may be placed in a ball or round heap in the center of a pizza pan 30, said pizza pan including a circular, flat surface 31 and an upwardly inclined relatively low peripheral lip 32. It will be understood that pizza dough has relatively high tensile characteristics for dough and requires substantial pressure and pulling to spread and form the dough to the pan. Roller device 10 may be first grasped at the interconnecting means with fingers of the hand and with the palm hand resting upon the convexly curved short roller 14. It will be apparent that the curvature of roller 14 facilitates comfortable pressure contact of the surface 15 with the palm of the hand. The long roller 11 is then placed against the center of the dough heap and then moved under pressure radially outwardly from the center of the heap and pan causing a portion of the dough to be moved toward the peripheral edge of the pan. This action is repeated several times in a progressive manner about the center of the pan and dough heap. The action is facilitated by simply turning the pizza pan by the other hand. The dough is thus rapidly initially spread toward the peripheral edge of the pan by the long roller 11. Since the long roller will overlap portions of already spread dough, the dough will be relatively uniformly spread across the bottom surface 31 of the pizza pan. Manual pressure is thus readily directed and transmitted from the palm of the hand along the plane of the wire members 16 to the long roller 11 and to the dough being spread. Long roller 11 thus serves to rapidly reduce and uniformly spread the dough toward the periphery of the pan.

The rapid and efficient spreading of pizza dough by pizza roller device 10 will be readily apparent to those who have attempted to spread pizza dough at home. The device has utility in the spreading of other types of dough and in the forming of the dough to pans of selected shape. It will be also apparent that device 10 has still additional utility in providing roller surfaces of different type for spreading different materials inasmuch as the cylindrical roller 11 provides for uniform spreading or smoothing of material over a relatively wide area while the shorter convexly curved roller 14 provides for application of pressure to such material in a more concentrated area. Some lateral pulling and working of the dough will be accomplished by the shorter convexly curved roller as it is moved across the surface of the material to be spread.

Various modifications and changes may be made in the device 10 which may come within the spirit of this invention and all such changes and modifications coming within the scope of the appended claim are embraced thereby.

We claim:

A composite roller device for facilitating spreading and uniform distribution of a relatively small globular mass of material over an initially large surface area and then over a relatively narrow marginal surface area, comprising the combination of: a long roller having a cylindrical surface for rapidly reducing the thickness of said mass of material and spreading material over said large area; a short roller having a longitudinally convexly curved surface for spreading material over narrow marginal surface areas, said short roller having a maximum diameter approximately the same as the diameter of the long roller, the axes of said rollers being parallel; and a planar interconnecting means extending between said rollers and comprising connecting members symmetrically arranged in back-to-back relation and secured together adjacent said rollers, said members having ends rotatably connected with said rollers at their axes, said connecting members having central portions of less width than the length of said short roller, said central portions and the surface of one roller serving as grasping and positioning means for a hand, the surface of said one roller providing a pressure surface for contact by the palm portion of a hand, said central portions and said one roller directing pressure to the other of said rollers in contact with said material for pressure spreading of said material.

References Cited in the file of this patent

UNITED STATES PATENTS 1,501,342     Hoard _____ July 15, 1924

FOREIGN PATENTS 202,930     Great Britain _____ Aug. 30, 1923
597,427     Great Britain _____ Jan. 26, 1948